US012680873B2

(12) United States Patent
Imai et al.

(10) Patent No.: US 12,680,873 B2
(45) Date of Patent: Jul. 14, 2026

(54) LIGHT DETECTION DEVICE

(71) Applicant: HITACHI HIGH-TECH CORPORATION, Tokyo (JP)

(72) Inventors: Ryo Imai, Tokyo (JP); Takashi Anazawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 77 days.

(21) Appl. No.: 18/873,886

(22) PCT Filed: Sep. 6, 2022

(86) PCT No.: PCT/JP2022/033397
§ 371 (c)(1),
(2) Date: Dec. 11, 2024

(87) PCT Pub. No.: WO2024/052984
PCT Pub. Date: Mar. 14, 2024

(65) Prior Publication Data
US 2025/0354866 A1 Nov. 20, 2025

(51) Int. Cl.
| | |
|---|---|
| *G01J 3/44* | (2006.01) |
| *G01J 3/02* | (2006.01) |
| *G01J 3/04* | (2006.01) |

(52) U.S. Cl.
CPC ........... *G01J 3/4406* (2013.01); *G01J 3/0259* (2013.01); *G01J 3/04* (2013.01)

(58) Field of Classification Search
CPC ........... G01J 3/4406; G01J 3/0259; G01J 3/04
USPC ........................................................ 356/317
See application file for complete search history.

(56) References Cited

U.S. PATENT DOCUMENTS

2004/0155309 A1* 8/2004 Sorin ................... G01N 21/554
257/431

FOREIGN PATENT DOCUMENTS

| JP | 3536851 B2 | 6/2004 |
|---|---|---|
| JP | 2014194362 A | 10/2014 |

OTHER PUBLICATIONS

International Search Report of PCT/JP2022/033397 dated Sep. 22, 2022.

* cited by examiner

*Primary Examiner* — Sunghee Y Gray
(74) *Attorney, Agent, or Firm* — MATTINGLY & MALUR, PC

(57) ABSTRACT

A light detection device includes a flow channel array that is arranged with axes of a plurality of tubes in parallel to each other and constituting a flow channel plane. A light source emits light so that an oscillation direction of an electric field component of the light is parallel to the flow channel plane. An optical axis of the light is included in the flow channel plane, and the optical axis forms a predetermined angle $\theta_0$ with respect to a direction orthogonal to the axes of the plurality of tubes on the flow channel plane, and a light detection system detects light emission from the plurality of tubes.

8 Claims, 10 Drawing Sheets

(a)

(b)

(a) IRRADIATE AT ANGLE OF 0°

(b) IRRADIATE AT ANGLE >0°

$\theta_0 = 0°$ $\theta_0 = 55.6°$

LIGHT DETECTION DEVICE

TECHNICAL FIELD

The present invention relates to a light detection device, and particularly to a device that detects fluorescence emitted from a fluorescent material in a flow channel array.

BACKGROUND ART

There is a measurement method with which a substance flowing in a plurality of flow channels is detected by fluorescence to be analyzed. An example of such a method includes analysis of molecules using a capillary electrophoretic device. For example, DNA labeled with a fluorescent dye is electrophoresed in a capillary and separated by size. A detection portion provided on the capillary is irradiated with excitation light, and generated fluorescence is detected. In these devices, a plurality of flow channels may be mounted in order to improve the throughput of measurement. In the capillary electrophoretic device, several to several tens of capillaries may be mounted.

In the device that detects and measures fluorescence in the plurality of flow channels, it is necessary to irradiate the inside of each flow channel with excitation light in order to measure fluorescence of a sample in each flow channel. A method for simultaneously irradiating the plurality of flow channels with excitation light includes a known method for allowing excitation light to be incident on side surfaces of flow channels arranged in a line (array).

PTL 1 discloses a configuration in which a side surface of a capillary array is irradiated with excitation light. This method can efficiently use the power of the excitation light as compared with the method for dividing the excitation light and irradiating each flow channel with the divided excitation light. In the fluorescence measurement, only a small part of the excitation light is used for exciting the phosphor, and most of the excitation light passes through the flow channel as it is. In the configuration in which the excitation light is incident on the array side surface, the excitation light that is not used for the excitation can be reused for the excitation of the sample in the next flow channel. As a result, the requirement for the output of a light source can be reduced as compared with the method with which the excitation light is divided. This configuration also has an advantage that an optical system for dividing the excitation light is unnecessary.

In the configuration in which the excitation light is incident on the side surface of the flow channel array, the light beam of the excitation light needs to pass through the inside of all the capillaries without a large loss. In particular, in a case where the flow channel is a capillary having a circular cross section, it is known that this state is not achieved under any condition, and is not achieved unless a specific condition related to the inner and outer diameters of the capillary, the refractive index, and the like is satisfied (PTL 2). This condition is caused by the capillary acting as a rod lens due to the circular cross section when the light beam passes through the capillary.

As an example, in a case where the capillary is placed in air and air is inside thereof, the capillary acts as a rod lens with a negative focal length, i.e., a concave rod lens. In such a case, the excitation light is diffused by the capillary, and the power of the excitation light is greatly lost while the excitation light is propagating through the capillary array. When the capillary is used as a configuration of a fluorescence detection device, a capillary diameter and parameters of a substance to be filled in the capillary and the like are adjusted in order to avoid such a situation.

CITATION LIST

Patent Literature

PTL 1: JP 2014-194362 A
PTL 2: JP Patent No. 3536851

SUMMARY OF INVENTION

Technical Problem

In a device that performs fluorescence detection in parallel in a plurality of flow channels, it is desirable that the power of excitation light with which each flow channel is irradiated is uniform in order to make measurement performance of each flow channel uniform. In order to increase the detection sensitivity and to weaken the requirement for a light source output, it is desirable that the power loss of the excitation light with which each flow channel is irradiated is as small as possible.

On the other hand, in a system in which the excitation light is incident from the side surface of the flow channel array described above, surface reflection loss occurs at the interface of each flow channel. As a result, the power of the emitted excitation light becomes weaker as the flow channel is farther from the excitation light incident side. Means for uniformizing the power of the excitation light with which each flow channel is irradiated includes a method for irradiating the side surface of the array with the excitation light in two directions, and a method for correcting a signal amount detected by a variable optical density filter for the power of the excitation light. However, these methods make the device configuration complicated. With these methods, the power of the excitation light with respect to flow channel is made uniform, but the loss of the excitation light is not reduced.

In system in which the plurality of flow channels is arranged in an array and detection is made, crosstalk between detection channels also becomes a problem. Reflection of the fluorescence signal on the surface of the flow channel and aberration of the detection optical system cause crosstalk with respect to measurement of each flow channel. Since the crosstalk becomes noise in fluorescence detection and causes a decrease in detection sensitivity and a dynamic range, it is desirable to reduce the crosstalk as much as possible.

The present invention has been made in view of the above problems. An object of the present invention is to reduce surface reflection loss of excitation light in the light detection device, thereby making the power of the excitation light with which each flow channel is irradiated more uniform.

In one example, an object is to configure a plurality of capillaries so that a light beam passes through the plurality of capillaries with a small loss, particularly when the flow channel is a capillary having a circular cross section. In another example, an object is to reduce crosstalk caused by surface reflection of fluorescence in the above configuration.

Solution to Problem

An example of light detection device of the present invention includes a flow channel array in which a plurality of tubes is arranged with axes of the plurality of tubes being parallel to each other, the flow channel array constituting a flow channel plane, an irradiation optical system including a light source and configured to irradiate light emitted from the light source such that an oscillation direction of an electric field component of the light is parallel to the flow channel plane, an optical axis of the light is included in the flow channel plane, and the optical axis forms a predetermined angle $\theta_0$ with respect to a direction orthogonal to the axes of the plurality of tubes on the flow channel plane, and a light detection system configured to detect light emission from each of the plurality of tubes, wherein the predetermined angle $\theta_0$ satisfies following Formulas 1 and 2 in Mathematical formula 2 with respect to an angle $\theta_1$ of a light beam in a material of the plurality of tubes and an angle $\theta_2$ of a light beam inside the plurality of tubes determined as Mathematical formula 1 based on a refractive index $n_0$ of a surrounding environment, a refractive index $n_1$ of the material of the plurality of tubes, a refractive index $n_2$ of the material inside the plurality of tubes, and the predetermined angle,

[Mathematical formula 1]

$$n_0 \sin\theta_0 = n_1 \sin\theta_1 = n_2 \sin\theta_2$$

[Mathematical formula 2]

$$\theta_0 > 0.1 \frac{n_1 n_2}{\sqrt{n_2^2(n_1 - n_0)^2 + n_0^2(n_2 - n_1)^2}} \qquad \text{Formula 1}$$

$$\frac{(n_0 - n_1)^2(n_1 - n_2)^2 \cos\theta_0 \cos^2\theta_1 \cos\theta_2}{(n_0\cos\theta_1 + n_1\cos\theta_0)^2(n_2\cos\theta_1 + n_1\cos\theta_2)^2} > 1. \qquad \text{Formula 2}$$

An example of a light detection device of the present invention includes a flow channel substrate including a plurality of flow channels arranged with axes being parallel to each other, the flow channel substrate constituting a flow channel plane, an irradiation optical system including a light source and configured to irradiate light emitted from the light source such that an oscillation direction of an electric field component of the light is parallel to the flow channel plane, an optical axis of the light is included in the flow channel plane, the optical axis forms a predetermined angle $\theta_0$ with respect to a direction orthogonal to the axes of the plurality of flow channels on the flow channel plane, and a light detection system configured to detect light emission from the plurality of flow channels, wherein the predetermined angle $\theta_0$ satisfies

[Mathematical formula 3]

$$0.1\frac{n_1}{|n_1 - n_0|} < \theta_0 < \arcsin\left(\sqrt{\frac{n_1^2(n_0^2 + n_1^2)}{n_0^4 + n_0^2 n_1^2 + n_1^4}}\right),$$

where a refractive index of a material of the flow channel substrate is presented by $n_0$, and a refractive index of a material inside the plurality of flow channels is represented by $n_1$.

Advantageous Effects of Invention

According to the light detection device of the present invention, the reflection loss of the excitation light on the flow channel surface can be reduced, and the uniformity of the power of the excitation light with respect to the plurality of flow channels can be improved.

In one example, particularly when the flow channel is a capillary having a circular cross section, by adjusting the angle of a light beam with respect to the direction orthogonal to the axis of the capillary, the configuration can be provided to cause the light beam to pass through the plurality of capillaries with a small loss.

In another example, by guiding only fluorescence generated from some positions on the plurality of capillaries to the fluorescence detection device, crosstalk between channels for measuring the capillaries can be reduced.

DESCRIPTION OF EMBODIMENTS

Figure 1:
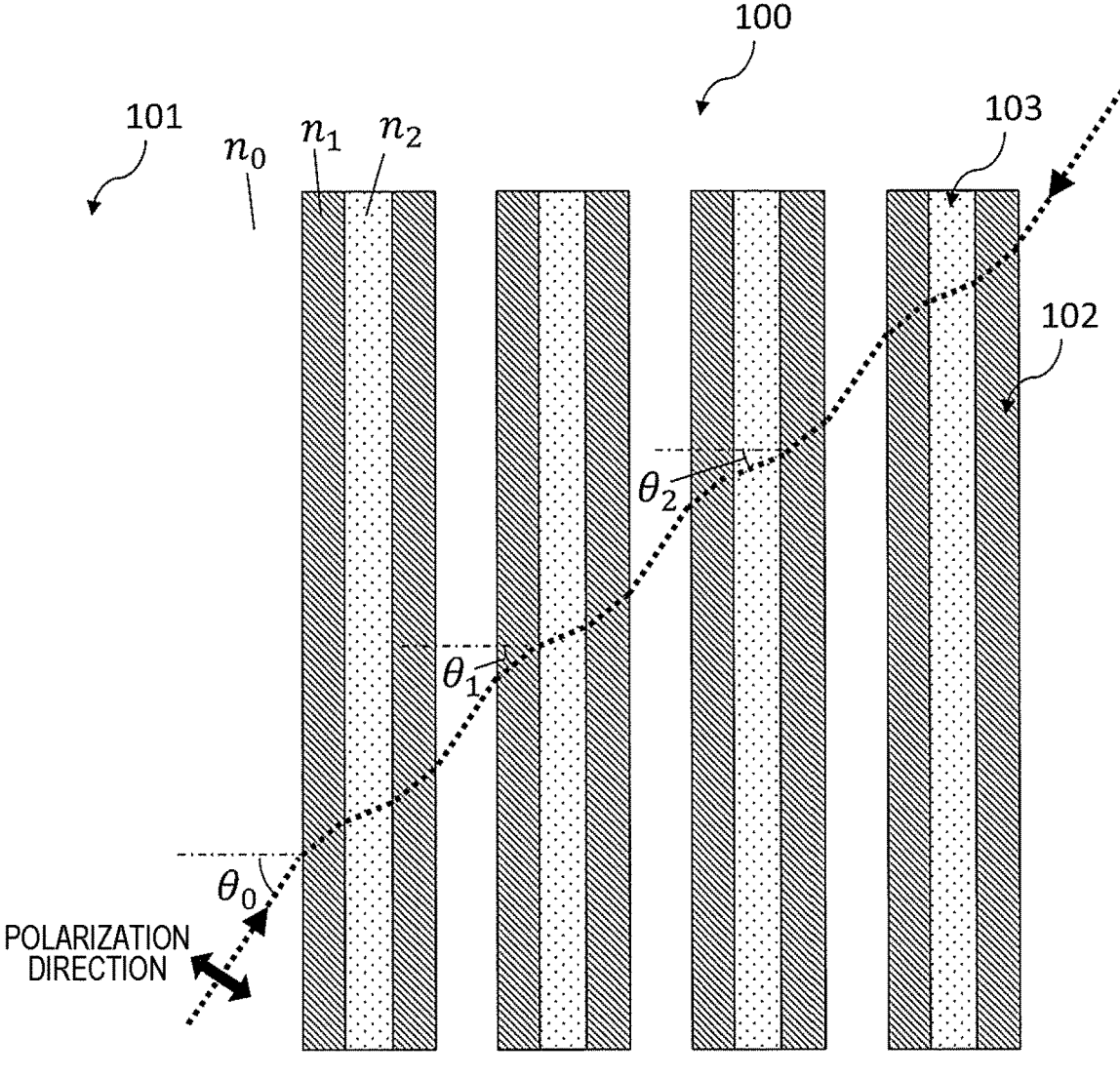
FIG. 1 is a schematic diagram of a light beam propagating through a flow channel array.

Prior to exemplification of specific embodiments, an angle range of light incident on an array capable of achieving improvement of uniformity of excitation light power with respect to a plurality of flow channels is derived. FIG. 1 illustrates a structure of a flow channel array in the embodiments of the present invention. In FIG. 1, in a flow channel array 100, a plurality of flow channels 102 is arranged in a peripheral environment 101 having a refractive index $n_0$. The flow channels 102 each are made of a material having a refractive index $n_1$. A lumen 103 exists in each of the flow channels 102. A substance (liquid, gel, or the like) having a refractive index $n_2$ is injected into the lumen 103.

Light from a light source is incident on a side surface of the flow channel array 100. In FIG. 1, light is incident on both sides of the same optical path. Alternatively, the light may be incident on only one side.

The light propagates through the flow channels and emitted to the lumens 103 of all the flow channels 102. In this configuration, the light beam propagates in a plane defined by the flow channel array (the plane including the center axes of all the flow channels). Note that since it is desirable that the light from the light source has high linearity in order to efficiently irradiate the flow channel array, a laser beam is mainly used.

An incident angle of light incident on the array side surface is represented by $\theta_0$. That is, the optical axis of the light from the light source forms a predetermined angle $\theta_0$ with respect to the direction orthogonal to the axes of the flow channels 102 on the flow channel plane. In this case, propagation angles $\theta_1$ and $\theta_2$ in the regions of the refractive indexes $n_1$ and $n_2$ are determined by the Snell's law as expressed in the following formula (1).

[Mathematical formula 4]

$$n_0 \sin \theta_0 = n_1 \sin \theta_1 = n_2 \sin \theta_2 \tag{1}$$

Note that $\theta_1$ represents an angle of a light beam in the material of the flow channels 102, and 02 represents an angle of a light beam inside the flow channel 102.

In order to reduce the surface reflection loss and improve the uniformity of the excitation light power described in the present a polarization disclosure, direction of the irradiation light is preferably parallel to the plane defined by the flow channel array. In other words, an oscillation direction of an electric field component of the light from the light source is parallel to the flow channel plane, and the optical axis of the light from the light source is included in the flow channel plane. Even if the oscillation direction of the electric field component is slightly deviated from the direction parallel to the plane defined by the flow channel array, it is possible to obtain the effect of improving the uniformity of the excitation light power described in the present disclosure to some extent when the angle between the oscillation direction and the plane defined by the flow channel array is small. Also in a case where the polarization is elliptical polarization, the similar effect is obtained as long as most of the electric field component is included in the plane defined by the flow channel array.

In the flow channel array 100 as illustrated in FIG. 1, four interfaces exist for one flow channel 102. That is, as for the four interfaces, the refractive index changes from $n_0$ to $n_1$, $n_1$ to $n_2$, $n_2$ to $n_1$, and $n_1$ to $n_0$. When the polarization of the light is in the plane defined by the flow channel array, amplitude transmittance t of the light at these interfaces is obtained by the Fresnel formula as expressed by the following formula (2).

[Mathematical Formula 5]

$$t_{0\to1} = \frac{2n_0 \cos \theta_0}{n_1 \cos \theta_0 + n_0 \cos \theta_1} \tag{2}$$

$$t_{1\to2} = \frac{2n_1 \cos \theta_1}{n_2 \cos \theta_1 + n_1 \cos \theta_2}$$

$$t_{2\to1} = \frac{2n_2 \cos \theta_2}{n_1 \cos \theta_2 + n_2 \cos \theta_1}$$

$$t_{1\to0} = \frac{2n_1 \cos \theta_1}{n_0 \cos \theta_1 + n_1 \cos \theta_0}$$

The indices of the transmittance represent the respective interfaces. The amplitude transmittance of one flow channel is the product of the above transmittances, and is obtained by the following formula (3).

[Mathematical Formula 6]

$$t_c(\theta_0) = \tag{3}$$

$$t_{0\to1}t_{1\to2}t_{2\to1}t_{1\to0} = \frac{16n_0 n_1^2 n_2 \cos \theta_0 \cos^2 \theta_1 \cos \theta_2}{(n_1 \cos \theta_1 + n_1 \cos \theta_0)^2 + (n_2 \cos \theta_1 + n_1 \cos \theta_2)^2}$$

In PTL 2, light from light source is perpendicularly incident on an array in major axial direction. That is, $\theta_0 = 0°$. At this time, amplitude transmittance $t_c$ of one flow channel is obtained by the following formula (4).

[Mathematical Formula 7]

$$t_c(0°) = \frac{16n_0 n_1^2 n_2}{(n_0 + n_1)^2 + (n_1 + n_2)^2} \tag{4}$$

When polarization is p polarization at a certain optical interface, it is known that there is an incident angle at which the transmittance is higher than that in a case where the incident angle is 0°. In particular, an angle through which entire light is transmitted exists, and this angle is known as the Brewster's angle. Even in the structure as illustrated in FIG. 1 having the plurality of interfaces, by setting the angle $\theta_0$ to be in an appropriate range, the light transmittance of the flow channel can be made higher (reflection loss can be made lower) than that in the case where the incident angle is 0°, and the power of the light with which each flow channel is irradiated can be made more uniform.

The range in which the above effect is obtained is expressed as a range in which the intensity transmittance $T_c$ of light with respect to the flow channel, the intensity transmittance being expressed by the square of the amplitude transmittance, is larger than that in the case of 0°. That is, the angle $\theta_0$ may be within the angle range that satisfies the following Formula (5).

[Mathematical Formula 8]

$$\frac{T_c(\theta_0)}{T_c(0°)} = \frac{|t_c(\theta_0)|^2}{|t_c(0°)|^2} > 1 \tag{5}$$

This formula is specifically written down as follows:

[Mathematical Formula 9]

$$\left| \frac{(n_0 + n_1)^2 + (n_1 + n_2)^2 \cos\theta_0 \cos^2\theta_1 \cos\theta_2}{(n_1\cos\theta_1 + n_1\cos\theta_0)^2 + (n_2\cos\theta_1 + n_1\cos\theta_2)^2} \right|^2 > 1. \tag{6}$$

Under the situation assumed by the present disclosure, the value in the left parenthesis is a positive real number. Thus, the above formula may be rewritten as follows:

[Mathematical Formula 10]

$$\frac{(n_0 + n_1)^2 + (n_1 + n_2)^2 \cos\theta_0 \cos^2\theta_1 \cos\theta_2}{(n_1\cos\theta_1 + n_1\cos\theta_0)^2 + (n_2\cos\theta_1 + n_1\cos\theta_2)^2} > 1. \tag{7}$$

Figure 2:
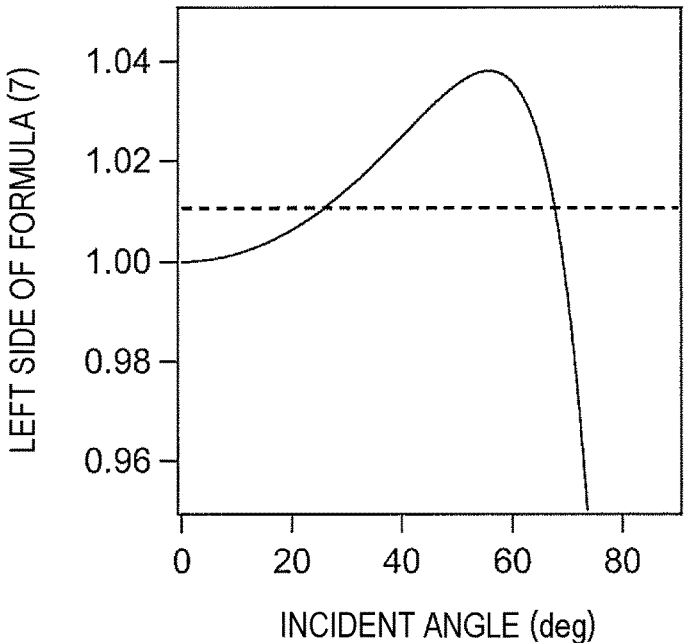
FIG. 2 is a graph obtained by plotting the left side of Formula (7).

FIG. 2 is a graph illustrating values on the left side of Formula (7) when $n_0=1$, $n_1=1.46$, and $n_2=1.33$ on the assumption that a periphery of the flow channels is filled with air, the material of the flow channels is quartz glass, and the lumens of the flow channels are filled with water. A region in which the value in FIG. 2 exceeds 1 is a range in which the uniformity of the improved excitation light power can be obtained. This range is determined by a lower limit of 0° and upper limits $n_0$, $n_1$, and $n_2$, and is 69.1° under the above conditions. However, in the left side of Formula (7), the inclination with respect to $\theta_0$ around 0° is almost zero, and an angle range in which the significant loss reduction effect can be actually obtained is narrower than the above range.

When the left side in Formula (6) is expanded with respect to $\theta_0$ and a term of a third or more orders with respect to $\theta_0$ is ignored, the following Formula (8) holds.

[Mathematical Formula 11]

$$\frac{T_c(\theta_0)}{T_c(0°)} \sim 1 + \frac{n_2^2(n_1 - n_0)^2 + n_0^2(n_2 - n_1)^2}{n_1^2 n_2^2}\theta_0^2 \tag{8}$$

The second term of Formula (8) represents an increase in the intensity transmittance. As an example, in the capillary electrophoresis device, about several tens of capillaries may be arranged. In such a case, even if the change in the second term is small, the overall loss reduction and the excitation light power uniformizing effect become great. For example, in a case where $n_0=1$, $n_1=1.46$, $n_2=1.33$, and the number of flow channels is 20, the power of the light emitted to the last flow channel is 23.7% with respect to the power of the light before incident on the flow channel array when $\theta_0=0°$. On the other hand, in a case where the transmittance improving effect (the second term in Formula (8)) is 0.01 (although not strict due to approximation, it is schematically illustrated by a broken line in FIG. 2.), the power of light emitted to the last flow channel is 28.6%, which is improved by about 5%.

It can be said that the lower limit angle at which the actual improving effect can be obtained as described above is such a degree that the value of the second term of the Formula (8)

exceeds 0.01, which is expressed by a mathematical formula and expressed as a range of the angle $\theta_0$ as follows:

[Mathematical formula 12]

$$\theta_0 > 0.1 \frac{n_1 n_2}{\sqrt{n_2^2(n_1 - n_0)^2 + n_0^2(n_2 - n_1)^2}}. \tag{9}$$

In the above example, when $n_0=1$, $n_1=1.46$, and $n_2=1.33$, the value on the right side is 17.8°.

PTL 1 discloses a configuration in which excitation light is incident on a flow channel array at an angle. The purpose of this configuration is to prevent return light to the light source, the return light being caused by light reflection of the capillary, and it is disclosed that an angle of about several degrees is provided. On the other hand, the range of the angle necessary for uniformizing the irradiation light power is clearly different from the angle range of about several degrees disclosed in PTL 1 as calculated above.

In a case where the light from the light source is incident at an angle of about several degrees, the effect of reducing the reflection loss by the angle is negligible, and is substantially equivalent to the case where the incident angle is 0°. In order to obtain the effect of uniformizing the irradiation light power, it is necessary that the polarization of the excitation light is in the plane defined by the flow channels. However, PTL 1 does not describe such a condition. On the other hand, according to the configuration of the present disclosure, since the excitation light is inevitably not reflected toward the light source, the return light is also prevented.

In the above example, when $n_0=1$, $n_1=1.46$, and $n_2=1.33$, the angle at which the intensity transmittance becomes a peak is 55.8° from FIG. 2. In this condition, the reflection loss due to the flow channels is minimized, which is most advantageous for uniformizing the power of the excitation light to be emitted.

Under the above conditions, the reflection loss at the interface between air ($n_0=1$) and quartz glass ($n_1=1.46$) is dominant. Due to this influence, the angle at which the transmittance has a peak obtains a value close to the Brewster's angle of 55.6° at the interface between the air and the quartz glass. As described above, in a case where the reflection loss at a specific interface is significantly large, if a condition is set so that the incident angle with respect to the interface is the Brewster's angle, the angle is almost optimal for the loss reduction.

In the above case, Formula (8) can be further simplified. For example, it is assumed that the flow channels 102 are made of resin, glass, or the like, are disposed in air, and are filled with an aqueous solution, gel, or the like. In such a case, the conditions are mostly $n_0=1$, $n_1=$about 1.4 to 1.5, and $n_2=$about 1.3 to 1.5. In such a case, the reflection loss due to the interface between the air and the flow channels becomes dominant. At this time, the number of interfaces to be considered decreases $n_0 \rightarrow n_1$ and $n_1 \rightarrow n_0$, and Formula (7) is simplified as follows:

[Mathematical formula 13]

$$\frac{(n_0 + n_1)^2 \cos\theta_0 \cos\theta_1}{(n_0\cos\theta_1 + n_1\cos\theta_0)^2} > 1. \tag{10}$$

The angle $\theta_1$ is deleted from the above formula according to the Snell's law and the above formula is rewritten as an inequality with respect to $\theta_0$ as follows:

[Mathematical formula 14]

$$0 < \theta_0 < \arcsin\left(\sqrt{\frac{n_1^2(n_0^2+n_1^2)}{n_0^4+n_0^2n_1^2+n_1^4}}\right) \quad (11)$$

Note that the arcsin function represents an inverse function of the sin function.

Formula (9) can also be simplified. The angle range of $\theta_0$ in which an actual effect can be obtained in combination with Formula (11) is as follows:

[Mathematical formula 15]

$$0.1\frac{n_1}{|n_1-n_0|} < \theta_0 < \arcsin\left(\sqrt{\frac{n_1^2(n_0^2+n_1^2)}{n_0^4+n_0^2n_1^2+n_1^4}}\right) \quad (12)$$

Figure 3:
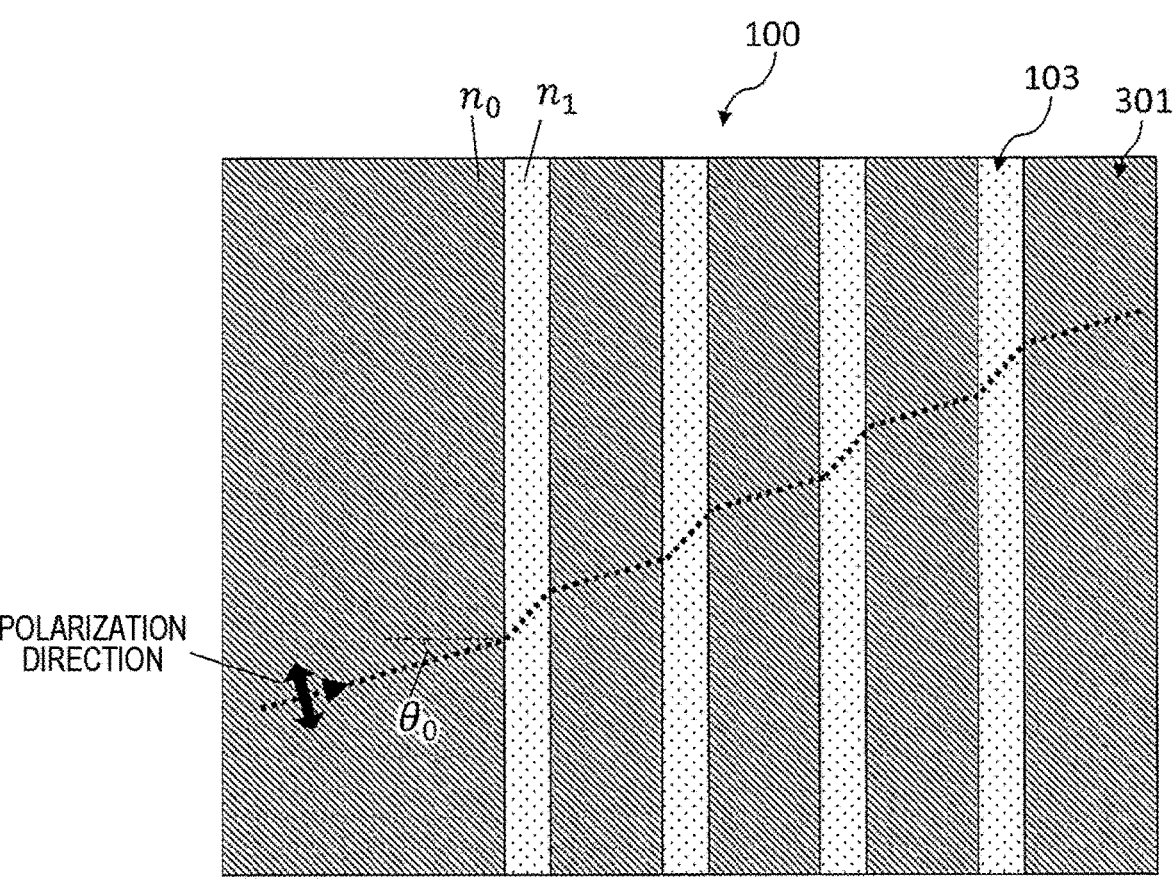
FIG. 3 is a schematic diagram relating to a light beam propagating through a flow channel array provided in a flow channel substrate.

The above formula (12) can also be applied to the case of the structure in FIG. 3. In the structure of FIG. 3, the flow channel array 100 is provided on a flow channel substrate 301 having the refractive index no. The flow channel substrate 301 has a plurality of lumens 103 therein. The plurality of lumens 103 is arranged such that axes thereof are parallel to each other. Each lumen 103 functions as a flow channel, and the flow channel substrate 301 constitutes a flow channel plane.

A substance (liquid, gel, or the like) having the refractive index $n_1$ is injected into each lumen 103 (that is, the inside of the flow channel substrate 301). In this case, the angle range in which the effect of improving the uniformity of excitation light power is obtained is the same as that in Formula (12). In this case, $\theta_0$ is defined as a propagation angle of light from the light source in the flow channel substrate 301.

PTL 1 discloses a structure in which excitation light is emitted to both sides of the flow channel array in order to prevent variations in power of the excitation light to be emitted, the variations being caused by reflection loss at a flow channel interface. On the other hand, with the configuration of the present disclosure, even light irradiation at one side can achieve more uniform light irradiation as compared with a case where light is incident on both sides with $\theta_0$=0°.

When the above conditions are specifically written down, the following Formula (13) holds:

[Mathematical formula 16]

$$\frac{\left(\frac{16n_0n_1^2n_2}{(n_1+n_0)^2+(n_1+n_2)^2}\right)^{2\left(ceil\left(\frac{N}{2}\right)-1\right)}+\left(\frac{16n_0n_1^2n_2}{(n_1+n_0)^2+(n_1+n_2)^2}\right)^{2\left(N-ceil\left(\frac{N}{2}\right)\right)}}{1+\left(\frac{16n_0n_1^2n_2}{(n_1+n_0)^2+(n_1+n_2)^2}\right)^{2(N-1)}} < \left[\frac{16n_0n_1^2n_2\cos\theta_0\cos^2\theta_1\cos\theta_2}{(n_1\cos\theta_1+n_1\cos\theta_0)^2+(n_2\cos\theta_1+n_1\cos\theta_2)^2}\right]^{2(N-1)} . \quad (13)$$

Here, N is the number of flow channels, and ceil is a ceiling function. The left side of Formula (13) represents the ratio of the power of the light with which the lumen of a flow channel having the lowest power of the light to be emitted with respect to the power of the light with which the lumen of a flow channel having the highest power of the light to be emitted in a case where the light from the light source is divided into two and incident on both the sides of the flow channel array at an incident angle of 0°. In this configuration, the flow channel with the lowest irradiation power is the flow channel located at the center of the flow channel array, and the flow channel with the highest irradiation power is the flow channel located at both ends of the flow channel array.

The right side of Formula (13) represents the ratio of the power of the light with which the lumen of a flow channel having the lowest power of the light to be emitted with respect to the power of the light with which the lumen of a flow channel having the highest power of the light to be emitted in a case where the light from the light source is incident on one side at the angle $\theta_0$. The power of the light to be emitted is maximized in the flow channel irradiated with the light first, and is minimized in the flow channel located at the ends on a light extraction side (opposite to the incident side).

As described above, in a case where $\theta_0$ satisfies Formula (13), more uniform light irradiation can be achieved.

Note that Formula (13) assumes that light is incident only on one side of the flow channel array. Alternatively, the light may be incident so as to face each other on both sides of the flow channel array as illustrated in FIG. 1. In this way, more uniform light irradiation can be achieved. As the light incident on both sides, light from the single light source may be divided and used, or light from a plurality of light sources may be used.

Figure 4:
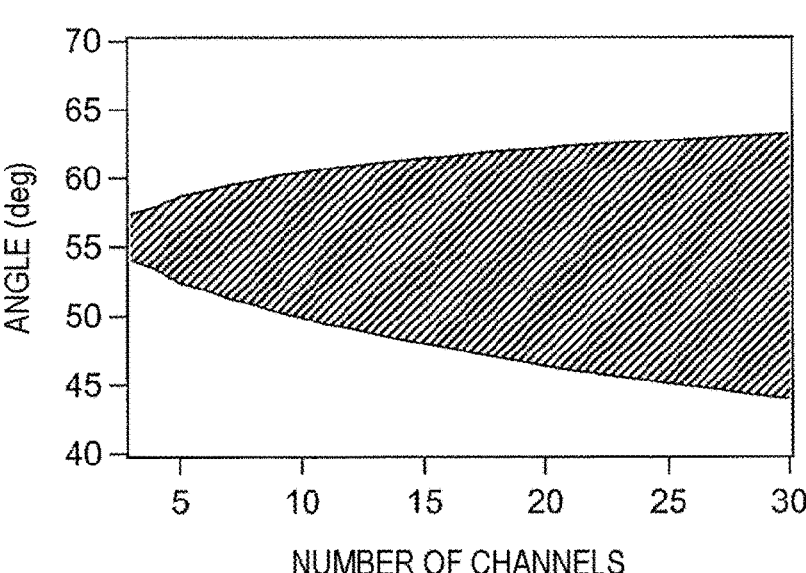
FIG. 4 is a graph of the number of flow channels and an angle range with which an excitation light power uniformizing effect can be obtained.

In FIG. 4, when $n_0$=1, $n_1$=1.46, and $n_2$=1.33, the angle range that satisfies the above Formula (13) for each number of the flow channels is indicated by hatching. In FIG. 4, Formula (13) is evaluated for each number of flow channels and the incident angle, and a region satisfying Formula (13) is indicated by hatching. When $\theta_0$ is within this angle range, light irradiation on one side enables irradiation with more uniform light power than in a case where light is incident on both sides of the array at the incident angle of 0°.

Note that, in applications where uniformity of excitation light power in each flow channel is particularly emphasized, higher uniformity of excitation light power may be obtained by irradiating both the sides of the flow channels with excitation light using the configuration of the present disclosure. In this case, the angle range may satisfy the Formula (7).

Note that, the configuration of the present disclosure is described by exemplifying the fluorescence detection device that detects fluorescence. Alternatively, the configuration of the present disclosure can also be used for a light detection device that detects light other than fluorescence as long as the device has a detection principle that generates signal light by applying excitation light. As an example, an object to be detected may be phosphorescence, Raman scattered light, or scattered light by an object flowing in a flow channel.

First Embodiment

Figure 5:
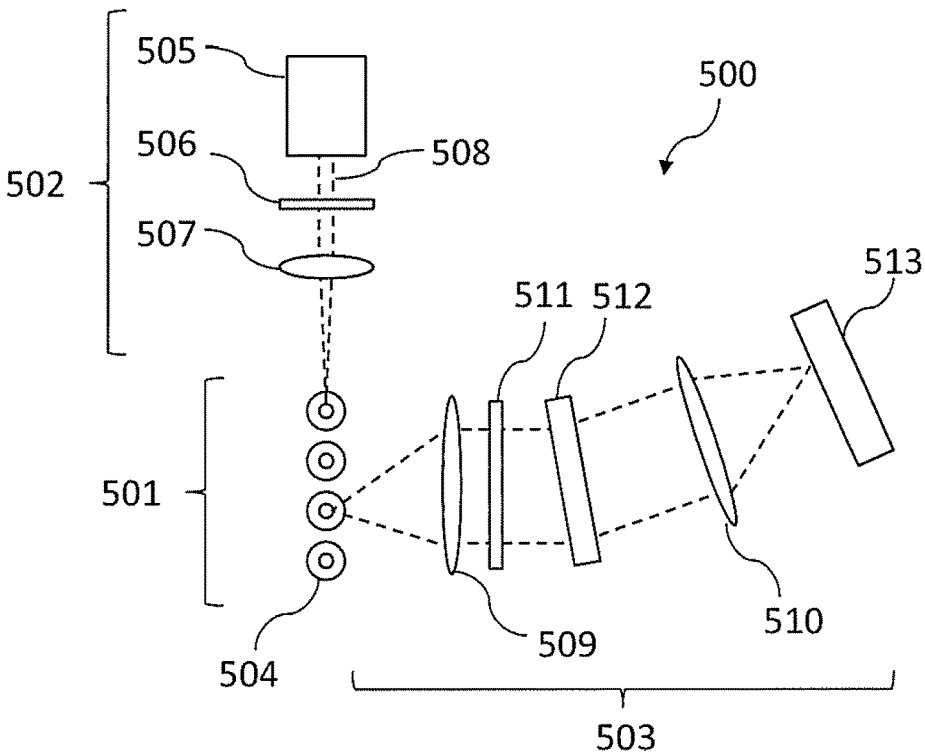
FIG. 5 is a configuration diagram of a fluorescence detection device 500 according to a first embodiment of the present invention.

FIG. 5 is a configuration diagram of a fluorescence detection device 500 according to a first embodiment of the present invention. Here, as an example of the configuration, an example of performing fluorescence detection of a sample in a capillary array is described.

The fluorescence detection device 500 is an example of the light detection device, and includes a capillary array 501, a fluorescence excitation optical system 502, and a fluorescence detection optical system 503. Note that the fluorescence detection device 500 is an example of a detection device in an electrophoresis system. In this case, in addition to the configuration of FIG. 5, it is preferable to include a power source for performing electrophoresis, a device for injecting a gel into a capillary, and the like. In FIG. 5, only the detection portion according to the present embodiment is illustrated.

The capillary 504 is an example of a tube constituting a flow channel, and may be also referred to as a small diameter tube. The cross-sectional shape of the tube is, for example, circular, but is not limited thereto. In general, the capillary is coated with polyimide or the like. The coating is removed at a portion where detection is performed.

The capillary array 501 is a flow channel array constituting a flow channel plane. The capillary array 501 has a structure in which a plurality of capillaries 504 is arranged so that axes thereof are parallel to each other.

The fluorescence excitation optical system 502 functions as an irradiation optical system and irradiates the capillary array 501 with light (a laser beam in the present embodiment). The fluorescence excitation optical system 502 includes a laser light source 505, a polarization control element 506, and a lens 507. The laser light source 505 is an example of the light source, and a light source other than a laser may be used.

A laser beam 508 emitted from the laser light source 505 is controlled by the polarization control element 506 so that an electric field oscillation direction of the later beam is within the plane defined by the capillary array 501. Thereafter, the laser beam 508 is condensed by the lens 507 and is incident on the side surface of the capillary array 501.

The laser beam 508 propagates inside the capillary array 501 and is emitted to a measurement target inside the capillary. Note that the fluorescence excitation optical system 502 may include a mechanism that adjusts the optical axis position with a reflecting mirror, a mechanism that attenuates the laser output and adjusts the power thereof, and the like, in addition to the mechanisms illustrated in FIG. 5.

The fluorescence detection optical system 503 is a detection optical system. The fluorescence emitted from a measurement target is detected by the fluorescence detection optical system 503. The fluorescence detection optical system 503 includes lenses 509 and 510, a wavelength filter 511, a grating 512, and a camera 513.

The fluorescence emitted from the measurement target is collimated by the lens 509. The wavelength filter 511 removes excitation light and transmits the fluorescence. The propagation angle of the fluorescence changes in accordance with the wavelength by the grating 512. Thereafter, the fluorescence is condensed on the camera 513 by the lens 510. In such a way, the fluorescence detection optical system 503 guides the light from each capillary 504 to the camera 513. The camera 513 is an example of the light detection system, and detects the light from each capillary 504. By performing the spectroscopy, the spectrum of the fluorescence emitted from the measurement target is observed on the camera 513.

FIG. 5 illustrates an example in which the fluorescence detection optical system 503 is a spectroscopic optical system with a case where a plurality of types of fluorescent dyes is detected by electrophoresis in mind. The fluorescence detection optical system 503 is not necessarily the spectroscopic optical system. In a case where spectroscopy is not necessary, such as a case where only one type of fluorescent dye is to be detected, the generated fluorescence may be directly detected by a detector. Also in the case of performing spectroscopy, the spectroscopic optical element does not necessarily have to be a grating, and spectroscopy may be performed by another spectroscopic optical element such as a prism.

The capillary array 501 can be irradiated with light in the form illustrated in FIG. 1. In this case, the angle range Oo in which the effect of uniformizing the excitation light power with respect to the capillary can be obtained using the above-described method.

In the calculation of the angle range described above, each interface is treated as a plane, but the capillary 504 has a circular cross section, and the interface on which the excitation light is incident is not a plane. However, if the laser beam 508 is condensed on the capillary array 501 to be smaller than the inner diameter and the outer diameter of the capillary 504, the above description can be approximately applied.

On the other hand, when the flow channel has a circular cross section, additional restrictions are imposed on the inner diameter, the outer diameter, and the pitch thereof. This is because the flow channels act as rod lenses. PTL 2 discloses a condition in a case where the laser beam is incident perpendicularly ($\theta_0 = 0°$) on the capillary array. However, in a case where the light is incident on the capillary array at an angle ($\theta_0 > 0°$), the restriction condition is different from the case of the perpendicular incident.

First, the case where a light beam is perpendicularly incident on the capillary array is considered. The cross section of the capillary is circular. The light beam emitted near the center of the capillary passes through four interfaces. Paraxial approximation is used to calculate the ABCD matrix for this capillary. The light beam incident on the capillary passes through the capillary in the steps of (i) passing through a capillary outer interface, (ii) propagating inside the capillary, (iii) passing through a capillary inner interface, (iv) propagating through the capillary lumen, (v) passing through the capillary inner interface, (vi) propagating inside the capillary, and (vii) passing through the capillary outer interface. Each ABCD matrix is expressed by the following Formula (14).

[Mathematical formula 17]

$$(14)$$

$$\text{(i) Capillary outer interface } \hat{R}_{out} = \begin{pmatrix} 1 & 0 \\ -\dfrac{n_1 - n_0}{n_1} \dfrac{1}{R_{out}} & \dfrac{n_0}{n_1} \end{pmatrix}$$

$$\text{(ii) Inside capillary } \hat{T}_1 = \begin{pmatrix} 1 & R_{out} - R_{in} \\ 0 & 1 \end{pmatrix}$$

$$\text{(iii) Capillary inner interface } \hat{R}_{in} = \begin{pmatrix} 1 & 0 \\ -\dfrac{n_2 - n_1}{n_2} \dfrac{1}{R_{in}} & \dfrac{n_1}{n_2} \end{pmatrix}$$

$$\text{(iv) Inside lumen } \hat{T}_2 = \begin{pmatrix} 1 & 2R_{in} \\ 0 & 1 \end{pmatrix}$$

$$\text{(v) Capillary inner interface } \hat{R}'_{in} = \begin{pmatrix} 1 & 0 \\ \dfrac{n_1 - n_2}{n_1} \dfrac{1}{R_{in}} & \dfrac{n_2}{n_1} \end{pmatrix}$$

-continued (vi) Inside Capillary $\hat{T}'_1 = \begin{pmatrix} 1 & R_{out} - R_{in} \\ 0 & 1 \end{pmatrix}$ (vii) Capillary outer interface $\hat{R}'_{out} = \begin{pmatrix} 1 & 0 \\ -\dfrac{n_0 - n_1}{n_0} \dfrac{1}{R_{out}} & \dfrac{n_1}{n_0} \end{pmatrix}$ (Note that (ii) inside the capillary and (vi) inside the capillary have the same matrix, but are denoted by different symbols for convenience.)

The ABCD matrix of all the capillaries is calculated as the product of the above matrices as follows:

[Mathematical formula 18]

$$\hat{C} = \hat{R}'_{out} \hat{T}'_1 \hat{R}'_{in} \hat{T}_2 \hat{R}_{in} \hat{T}_1 \hat{R}_{out}. \tag{15}$$

A focal length f of the lens function given to the light beam by the capillary is calculated from the ABCD matrix in the above Formula (15) as follows:

[Mathematical formula 19]

$$f = -\frac{1}{(\hat{C})_{21}}. \tag{16}$$

Note that the subscript "21" of the denominator represents a 2 rows-by-1 column component of the matrix.

Hereinafter, conditions to be satisfied by the derived focal length and the pitch of the capillaries will be described. Hereinafter, it is assumed that the capillaries are arranged at equal intervals at a pitch of a distance d. Assume that the focal lengths of the capillaries in the cross-sectional direction are f. In the calculation, the arrangement of the capillaries at equal intervals can be regarded as repetition in units of "space with distance d/2", "capillary", and "space with distance d/2". In the ABCD matrix, the propagation of the distance d/2 and the effect by the lens with the focal length f can be expressed by the following formula (17).

[Mathematical formula 20]

$$D_{\frac{d}{2}} = \begin{pmatrix} 1 & \dfrac{d}{2} \\ 0 & 1 \end{pmatrix} \tag{17}$$

$$\hat{F} = \begin{pmatrix} 1 & 0 \\ -\dfrac{1}{f} & 1 \end{pmatrix}$$

The optical effect of one unit described above is expressed by a matrix of the following formula (18).

[Mathematical formula 21]

$$\hat{D}_{\frac{d}{2}} \hat{F} \hat{D}_{\frac{d}{2}} = \begin{pmatrix} 1 - \dfrac{d}{2f} & d\left(1 - \dfrac{d}{4f}\right) \\ -\dfrac{1}{f} & 1 - \dfrac{d}{2f} \end{pmatrix} \tag{18}$$

When n capillaries exist, that is, when the above-described unit is repeated n times, the optical effect is expressed by:

[Mathematical formula 22]

$$\left(\hat{D}_{\frac{d}{2}} \hat{F} \hat{D}_{\frac{d}{2}}\right)^n.$$

In order to cause the entire amount of light incident on the end of the capillary array to pass through all the capillaries in the array, the light passing through the capillary has to be incident on the next capillary without dispersing. The influence on the height and angle of the light beam with respect to the optical axis are described in the ABCD matrix. Therefore, this condition can be rephrased as the following [Mathematical formula 23] is not dispersed with respect to n.

[Mathematical formula 23]

$$\left(\hat{D}_{\frac{d}{2}} \hat{F} \hat{D}_{\frac{d}{2}}\right)^n$$

This can be further paraphrased as a condition that as for an eigenvalue with a maximum absolute value among the eigenvalues of the matrix in Formula (18), the maximum absolute value is 1 or less.

The eigenvalue is calculated from the matrix in Formula (18) to be expressed by:

[Mathematical formula 24]

$$1 - \frac{d}{2f} \pm \sqrt{\frac{d}{2f}} \sqrt{\frac{d}{2f} - 2}. \tag{19}$$

When the inside of the second route in Formula (19) is positive, the absolute value of the eigenvalue with a minus sign exceeds 1 and the light is dispersed with respect to n. On the other hand, when the inside of the second route is negative, the absolute value of the two eigenvalues becomes 1, and the light is not dispersed. Therefore, the condition for uniformly irradiating all the capillaries is written as:

[Mathematical formula 25]

$$d < 4f. \tag{20}$$

Since d is a positive value, it can be seen that f must be a positive value to satisfy the above formula.

Results of examining the above conditions in comparison with the ray-trace simulation are shown below. In the simulation, ten capillaries having an outer diameter of 300 μm and an inner diameter of 100 μm are arranged. The refractive index of the material constituting the capillaries is set to 1.46, the refractive index of the material filled into the capillaries is set to 1.41, and the refractive index of the surrounding environment is set to 1. Laser light is perpendicularly incident on the side surface of the array. The diameter of the beam to be emitted is 20 μm. The light is polarized in a major axial direction of the flow channels. In the simulation, the power with which the inner diameter portion of each capillary is irradiated is calculated using ray tracing.

Figure 6:
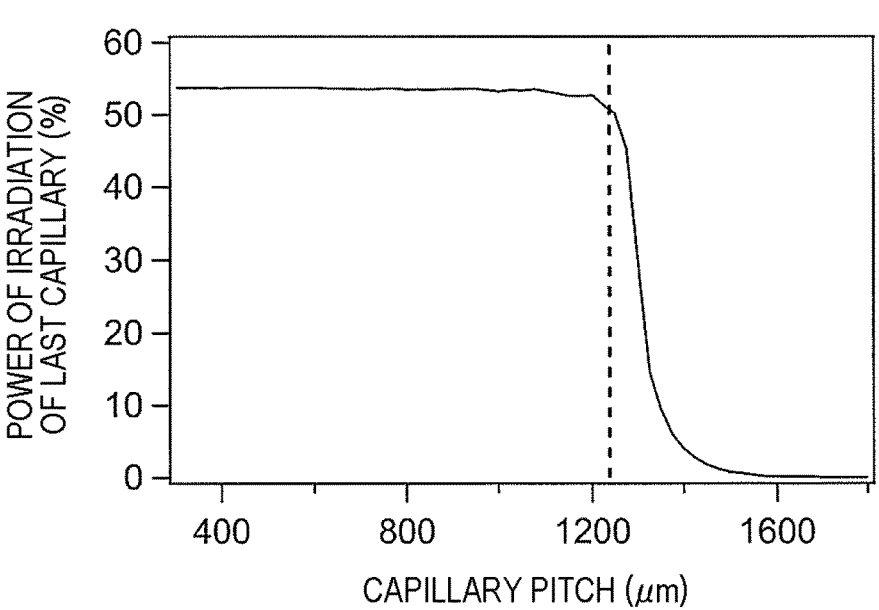
FIG. 6 is a graph relating to dependency of the power of light emitted to the tail capillary on capillary pitch.

In FIG. 6, the power of light emitted to the inner diameter of the tenth (last) capillary is plotted with respect to the pitch of the capillary. The power of light reaching the tenth capillary is 54% even at 300 μm (the same value as the outer diameter) where the pitch is minimized due to surface reflection loss in the capillary. It can be found that the power of light emitted to the tenth capillary starts decreasing around the pitch of 1200 μm. On the other hand, the right side of Formula (20) calculated under the above conditions is 1240 μm. The above-mentioned 1240 μm is indicated by a broken line in the graph. From this result, it can be found that the range of the pitch of the capillary allowed under the condition of Formula (20) can be defined.

Next, a case where light is incident on the capillary array at an angle $\theta_0$ will be described. As in the calculation regarding the transmittance described above, the refractive index of the surrounding environment is represented by $n_0$, the refractive index of the capillary material is represented by $n_1$, and the refractive index of the substance filled in the capillary lumen is represented by $n_2$. Angles of propagation in a material having respective refractive indexes are represented by $\theta_0$, $\theta_1$, and $\theta_2$.

Figure 7:
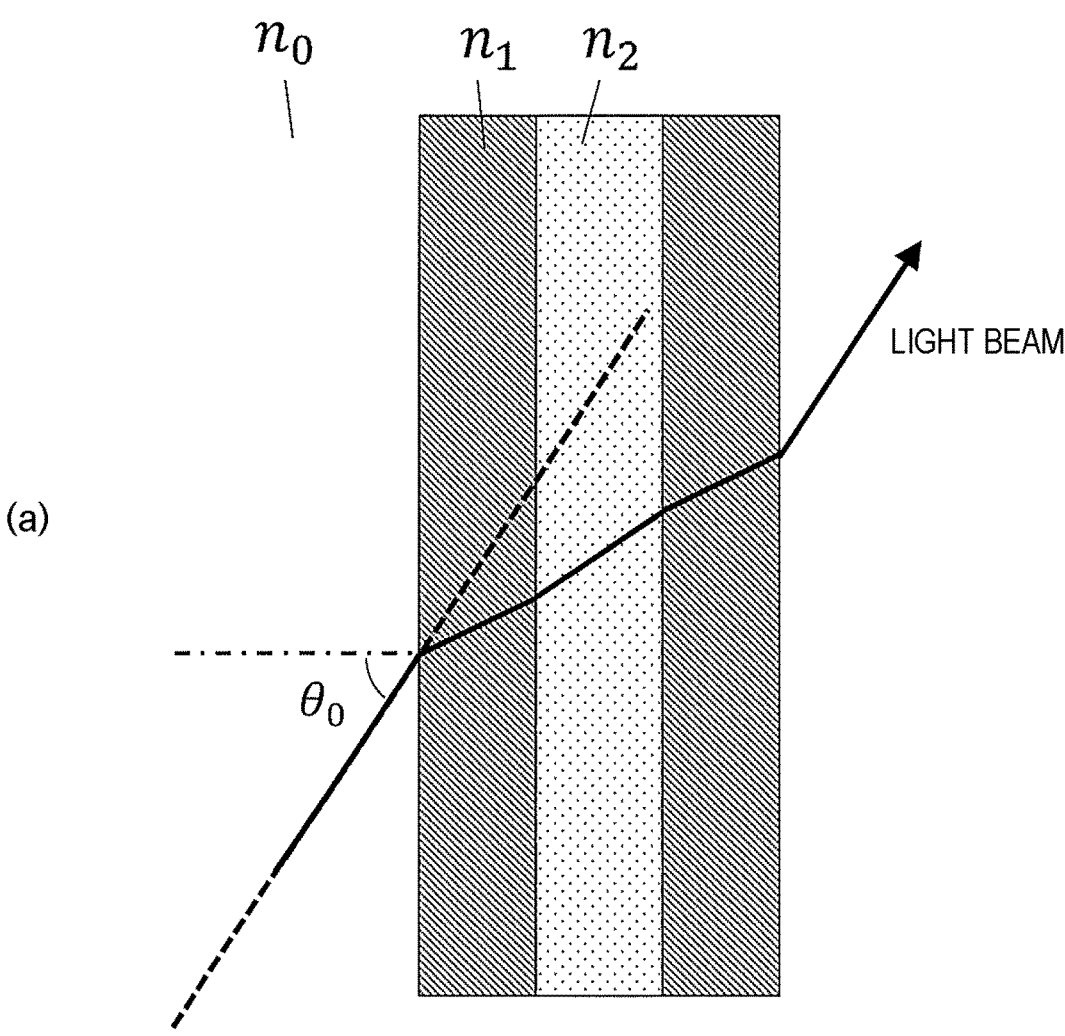
FIG. 7 is a view illustrating a cross-sectional shape of a capillary viewed in a cross section including excitation light.
Figure 7:
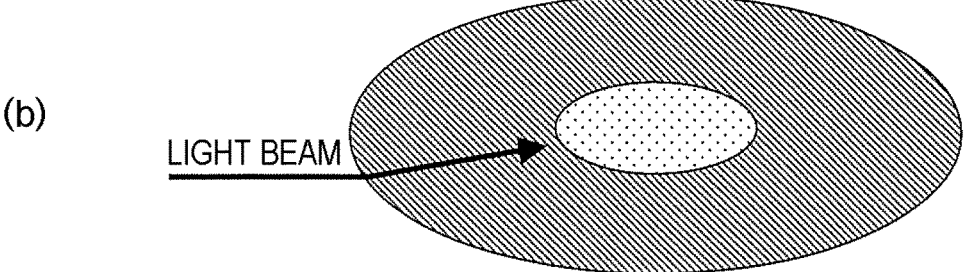

It is assumed that the capillary has a circular cross section. That is, the inner periphery and the outer periphery of the capillary are circular in a cross section taken along a plane orthogonal to the axis of the capillary. When the capillary is viewed in a cross section (broken line in FIG. 7(a)) including a light beam obliquely emitted to the capillary, the cross section of the capillary has an elliptical shape illustrated in FIG. 7(b). Considering the capillary outer diameter (radius $R_{out}$), the cross-sectional ellipse has a single axis radius of $R_{out}$ and a major axis radius of $R_{out}/\cos \theta_0$. The light beam is incident on the ellipse from the major axial direction.

In view of the above, when the aforementioned ABCD matrix is rewritten for the ellipse as expressed as follows:

[Mathematical formula 26]

$$\hat{R}_{out} = \begin{pmatrix} 1 & 0 \\ -\dfrac{n_1 - n_0}{n_1} \dfrac{1}{\cos \theta_0 R_{out}} & \dfrac{n_0}{n_1} \end{pmatrix} \tag{21}$$

$$\hat{T}_1 = \begin{pmatrix} 1 & (R_{out} - R_{in})/\cos \theta_1 \\ 0 & 1 \end{pmatrix}$$

$$\hat{R}_{in} = \begin{pmatrix} 1 & 0 \\ -\dfrac{n_2 - n_1}{n_2} \dfrac{1}{\cos \theta_0 R_{in}} & \dfrac{n_1}{n_2} \end{pmatrix}$$

$$\hat{T}_2 = \begin{pmatrix} 1 & 2R_{in}/\cos \theta_2 \\ 0 & 1 \end{pmatrix}$$

$$\hat{R}'_{in} = \begin{pmatrix} 1 & 0 \\ -\dfrac{n_1 - n_2}{n_1} \dfrac{1}{\cos \theta_2 R_{in}} & \dfrac{n_2}{n_1} \end{pmatrix}$$

$$\hat{T}'_1 = \begin{pmatrix} 1 & (R_{out} - R_{in})/\cos \theta_1 \\ 0 & 1 \end{pmatrix}$$

$$\hat{R}'_{out} = \begin{pmatrix} 1 & 0 \\ -\dfrac{n_0 - n_1}{n_0} \dfrac{1}{\cos \theta_1 R_{out}} & \dfrac{n_1}{n_0} \end{pmatrix}.$$

A method for deriving the condition for the light from the light source to pass through all the capillaries is the same as the case where the light is incident perpendicularly on the axis of the capillary. That is, the focal length f calculated by Formula (16) based on the ABCD matrix of the capillary calculated by Formula (15) may satisfy the condition of Formula (20). However, since the above calculation is performed in a form of being viewed from a plane having the angle do with respect to the cross-sectional direction of the capillary array, the conditional expression of Formula (20) for an actual capillary pitch d is deformed as:

[Mathematical formula 27]

$$\frac{d}{\cos \theta_0} < 4f. \tag{22}$$

To summarize the above, as for the outer radius $R_{out}$ and the inner radius $R_{in}$ of the capillary, the matrix of Formula (15) can be calculated by using the matrix expressed by Formula (21). Then, the focal length f in the direction orthogonal to the axis of the capillary can be calculated by using the 2 rows-by-1 column component of the matrix of Formula (15) and Formula (16). When the focal length f satisfies Formula (22) with respect to the pitch d of the capillaries in the flow channel array, the power with which the capillaries are irradiated can be further increased.

Results of examining the above conditions in comparison with the ray-trace simulation are shown below. The model is similar to the model in the case of the calculation in the graph of FIG. 6 described above, but differs only in the incident angle of the light beam. As for the angle of the excitation light to be incident, $\theta_0$=55.6°. This is the Brewster's angle in a case where the interface is a plane in the surrounding environment having a refractive index of 1 and the capillary material having a refractive index of 1.46.

Figure 8:
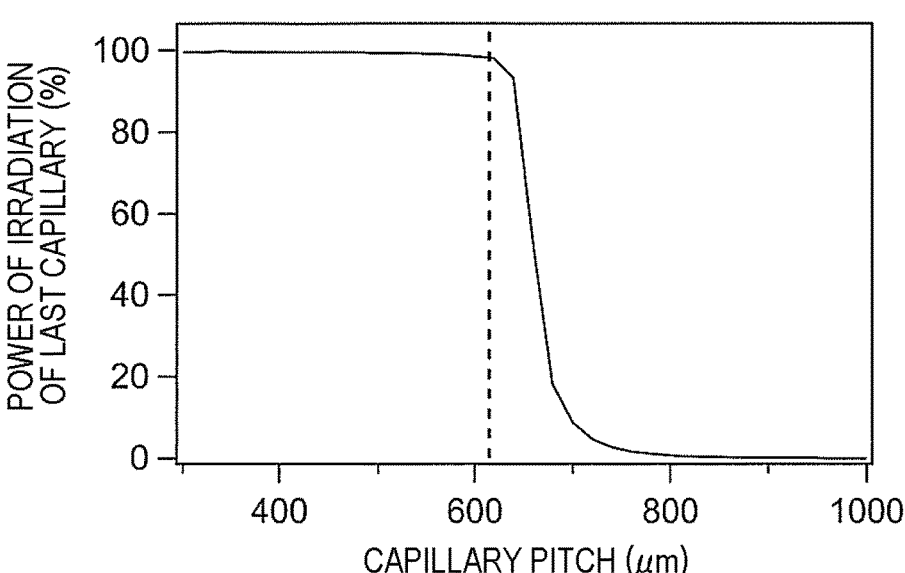
FIG. 8 is a graph relating to the dependency of the power of light emitted to the tail capillary on capillary pitch in the first embodiment.

In FIG. 8, the power of light emitted to the inner diameter of the tenth (last) capillary is plotted with respect to the pitch of the capillary. The loss of light power due to surface reflection of the capillary can be reduced by the effect of the present embodiment. For this reason, in the case of the capillary pitch of 300 μm, even the tenth capillary is irradiated with the power of 99.6% with respect to the light power before incident on the array. When $\theta_0$=0°, the power of light emitted to the tenth capillary is 54%, and it can be found that the reflection loss is reduced by the effect of the present embodiment.

The power emitted to the tenth capillary starts decreasing around the pitch of 600 μm. On the other hand, the right side of Formula (22) calculated under the above conditions is 615 μm. The above-described 615 μm is indicated by a broken line in the graph. This result indicates that the range of the pitch of the capillary allowed by Formula (22) can be defined.

Figure 9:
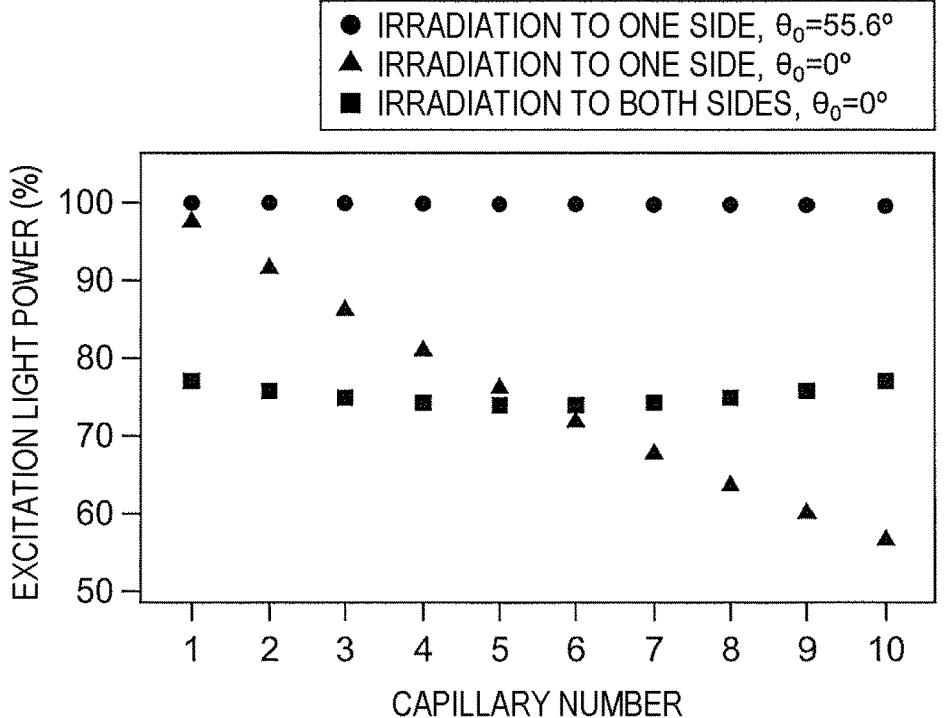
FIG. 9 is a graph of the power of the excitation light with which each capillary is irradiated.

FIG. 9 is a graph illustrating the power of the excitation light with which each of ten capillaries is irradiated when the capillary pitch is 300 μm using the same simulation model as that in FIGS. 6 and 8. A value of the excitation light power before incident on the array is expressed as 100%. In the configuration where the excitation light is emitted to both the sides of the array, it is assumed that the excitation light is divided into two beams having the same power.

In a case where the excitation light is incident on one side of the array at the incident angle of 0°, the power to be emitted decreases in accordance with the capillary number. On the other hand, in a case where the incident angle is 55.6°, the reflection loss is suppressed to be small, and the power of the excitation light to be emitted is more uniform.

In a case where excitation light is incident on both the sides of the array at the incident angle of 0°, a variation in the excitation light power is reduced as compared with the case where the irradiation to one side is performed at the incident angle of 0°. In this case, the coefficient of variation (value obtained by dividing the standard deviation by the average value) of the excitation light power of the ten capillaries is 1.5%. On the other hand, the coefficient of variation of the excitation light power in a case where the excitation light is incident on one side at an incident angle of 55.6° is 0.1%, and the power of the excitation light is more uniform than that in the case of the irradiation to both the sides.

Even in the case where the excitation light is emitted to both the sides, the power of the excitation light is lost by about 20% due to the reflection loss. On the other hand, with the configuration of the present embodiment, almost all the power of the excitation light can be used for excitation of fluorescence. In the case where the excitation light is emitted to both the sides, a mechanism for dividing a light beam and a mechanism for adjusting the two beams to be incident on the array in a coaxial state may be required, and the irradiation optical system becomes complicated. According to the configuration of the present embodiment, the effect of making the power of the excitation light uniform can be obtained only by the configuration in which the excitation light is angled.

In the above description, it has been shown that the reflection loss of the excitation light can be reduced and the power of the excitation light with which each capillary is irradiated can be made uniform by setting the angle $\theta_0$ to a certain constant angle in the first embodiment. In the method of the present embodiment, in addition to the above effects, the excitation light can be emitted when $\theta_0=0°$ by adjusting the angle $\theta_0$ also in a case where the conditions necessary for the light irradiation to the side surface of the capillary array cannot be satisfied.

As an example, the capillary has an outer diameter of 300 μm and an inner diameter of 50 μm. The refractive index of the material constituting the capillaries is set to 1.46. The refractive index of the material filled into the capillaries is set to 1.33. The refractive index of the surrounding environment is set to 1. This condition roughly corresponds to a case where water is filled in the capillaries made of quartz glass placed in air.

Assuming that the excitation light is incident at $\theta_0=0°$, the focal length calculated by Formula (16) is –866 μm. Since the focal length is a negative value, Formula (20) cannot be satisfied with any capillary pitch. In this case, the excitation light propagating through the capillary array is dispersed due to the concave lens effect of the capillaries, and thus not all the capillaries are irradiated.

Under the above conditions, when the angle $\theta_0=55.6°$, the focal length has 652 μm which is a positive value, and a condition that satisfies Formula (22) can exist. At the same time, an effect of reducing the above-described surface reflection loss can be also obtained. Even under a condition where not all the capillaries can be irradiated with the excitation light in the conventional case where $\theta_0=0°$, the condition for propagation of the excitation light in the capillaries can be satisfied by adjusting the value of the angle $\theta_0$ in this manner.

In the configuration of the present embodiment, the excitation light obliquely propagates through the capillary array. Therefore, the position irradiated with the excitation light (the position where fluorescence detection is performed) varies for each capillary. For example, in a case where the fluorescence detection device of the present embodiment is applied to an electrophoresis device, the effective length of electrophoresis changes due to the above influence. In such a case, it is preferable to sequentially shift the arrangement of the capillaries. For example, in a case where the fluorescence detection point is shifted by 0.1 mm in the axial direction of the each capillary, each capillary in the array may be shifted in a stepwise manner by 0.1 mm.

Since the excitation light obliquely propagates through the capillary array, a length of a portion where fluorescence is generated in the lumen of the capillary becomes longer than that in the case where the excitation light is irradiated in the direction orthogonal to the axis of the capillary. This effect is about $2R_{in} \tan \theta_2$ when the radius of the capillary lumen is $R_{in}$ and the propagation angle of light in the capillary lumen is $\theta_2$. This deteriorates the detection resolution in a case where fluorescence detection is performed on the capillary.

As an example, in a case where the excitation light is incident on a capillary having an inner diameter of 50 μm, a surrounding environmental refractive index of 1, and a refractive index of a lumen portion of 1.41 at an angle of 55.6°, the length of a light emitting region increases by about 36 μm. The magnitude of the influence of this effect on the entire measurement depends on the type of measurement to be performed and the configuration of the flow channel array. In a case where this influence needs to be reduced, the incident angle can be set to be small within the angle range where the effect of the present embodiment can be obtained.

In the first embodiment, the configuration where the light detection device is used as the detection device in the capillary electrophoresis device is described. The application target of the configuration of the present disclosure is not limited to the above. The light detection device can also be applied to other measurement devices that optically measure the flow channel array.

First Embodiment: Summary

When the laser beam 508 is incident on the side surface of the capillary array 501, the fluorescence detection device 500 according to the first embodiment causes the laser beam 508 to have an angle with respect to a direction orthogonal to the axis of the capillaries in a plane defined by the capillary array. This angle is set to satisfy a condition of Formula (7) or (13). The polarization direction of the laser beam 508 is parallel to the plane defined by the capillaries. The pitch of the capillaries is set to satisfy a condition of Formula (22). With the above configuration, the surface reflection loss caused by the capillaries can be reduced. Further, the power of the laser beam with which each capillary is irradiated can be made more uniform as compared with the case where the laser beam is incident perpendicularly on the capillaries. Limitations on the outer diameter, inner diameter, and arrangement conditions of the capillaries can be adjusted by adjusting the laser light incident angle. Thereby, it is possible to establish an irradiation condition that cannot be achieved by a configuration in which light is perpendicularly incident on the capillaries.

Second Embodiment

Figure 10:
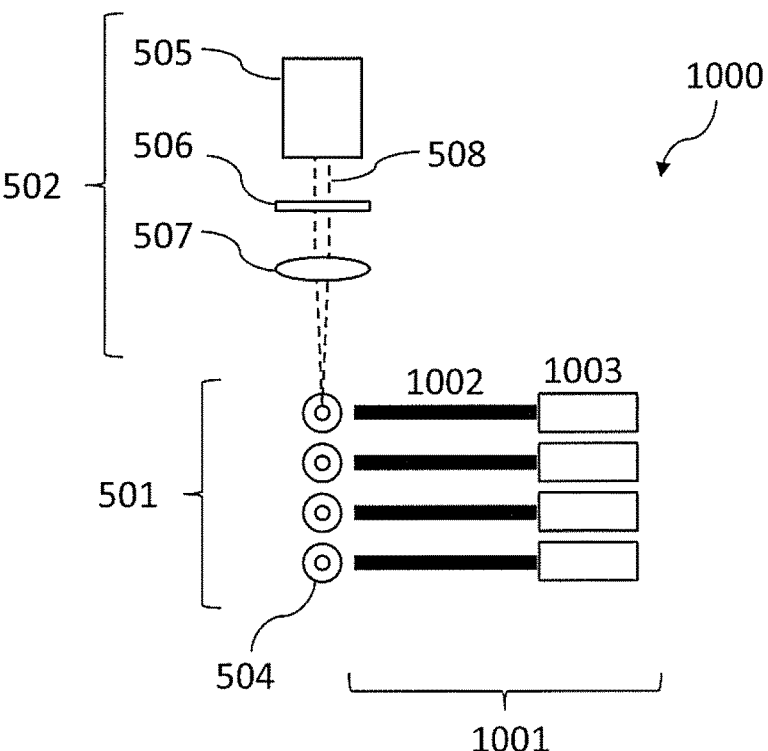
FIG. 10 is a configuration diagram of a fluorescence detection device 1000 according to a second embodiment of the present invention.

FIG. 10 is a configuration diagram of a fluorescence detection device 1000 according to a second embodiment of the present invention. The configuration of the fluorescence detection device 1000 can be similar to the configuration of the first embodiment illustrated in FIG. 5 as for the capillary array 501 and the fluorescence excitation optical system 502. A fluorescence detection optical system 1001 includes an optical fiber array 1002 for guiding fluorescence and a fluorescence detection device 1003. The optical fiber array 1002 includes a plurality of optical fibers.

A wavelength filter for removing excitation light and introducing only fluorescence into a detector may be disposed in front of the fluorescence detection device 1003. In the fluorescence detection device 1000, the fluorescence guided by the optical fiber is directly introduced into the detection device, but the detection optical system is not limited to this configuration. As an example, the rear end of the optical fiber array 1002 may be connected to the fluorescence detection optical system 503 illustrated in FIG. 5, and may be detected after being dispersed.

In the configuration illustrated in FIG. 10, the incident angle of the excitation light to the capillary array is set to the angle range described in the first embodiment. At this time, in addition to the effects described in the first embodiment, crosstalk between detection flow channels for detecting capillaries can be reduced.

The reason why the crosstalk can be reduced will be described below. The crosstalk here indicates a situation in which the fluorescence is mixed into a channel different from the channel for detecting the capillary emitting the fluorescence.

There are several causes of such crosstalk. In the case of the configuration illustrated in FIG. 10 as an example, fluorescence generated in the lumen of the capillary 504 is radiated in all directions. Thus, there is a case where a part of light enters an optical fiber installed for an adjacent capillary. In the fluorescence detection optical system 503 illustrated in FIG. 5, the profile of a spectral image formed on the camera 513 is broadened due to aberration of the lenses 509 and 510. Therefore, the profile may overlap the portion where the adjacent capillaries are detected.

Among several causes of crosstalk, crosstalk caused by surface reflection of the capillary can be reduced in the configuration of the present embodiment. Since the fluorescence generated in a certain capillary is emitted in all directions as described above, adjacent capillaries are also irradiated with the fluorescence. A part of the fluorescence is reflected on the surface of the capillary, and is incident on the optical fiber for detecting an adjacent capillary depending on a reflection angle and a position thereof.

Figure 11:
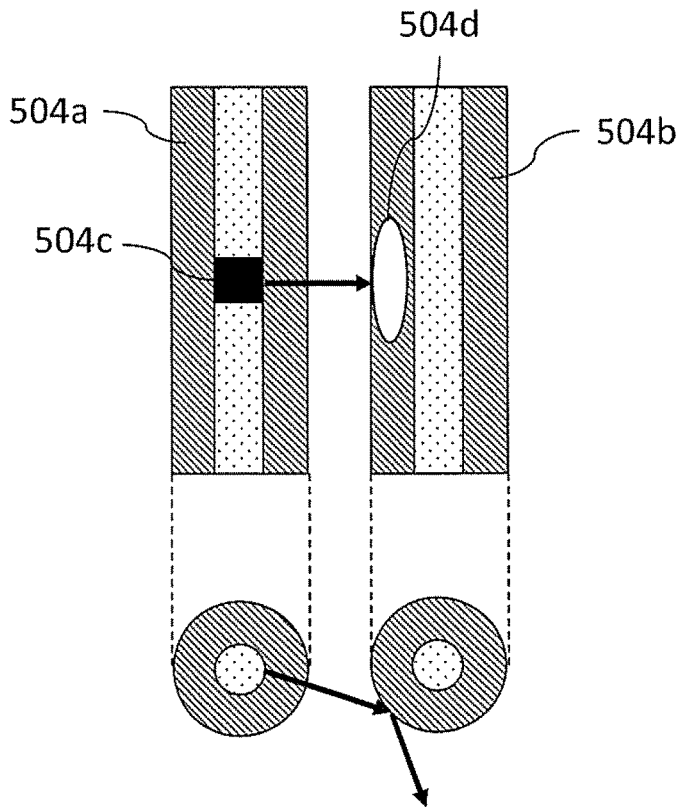
FIG. 11 is a schematic diagram illustrating a state in which crosstalk is caused by fluorescence reflection on the capillary surface.

At this time, a large ratio of the fluorescence vertically advancing from the light emitting site toward the adjacent capillary contributes to the crosstalk. FIG. 11 is a schematic diagram illustrating this situation. The fluorescence emitted from a light emitting portion 504c in a capillary 504a on the left side in FIG. 11 is radiated with equal intensity in all directions. However, only light that has traveled to the detector side assumed to be on the front side of the drawing is actually detected.

The light traveling vertically from the left capillary 504a to a right capillary 504b is reflected by the left half surface of the right capillary 504b. At this time, since the capillary 504b has a cylindrical shape, the light reflected by a region 504d easily enters the detector on the front side of the drawing. It can be said that the region 504d is a portion having a large influence on the crosstalk. The fluorescence emitted to the outside of the region 504d does not propagate toward the detector even when reflected by the surface of the capillary 504b.

Figure 12:
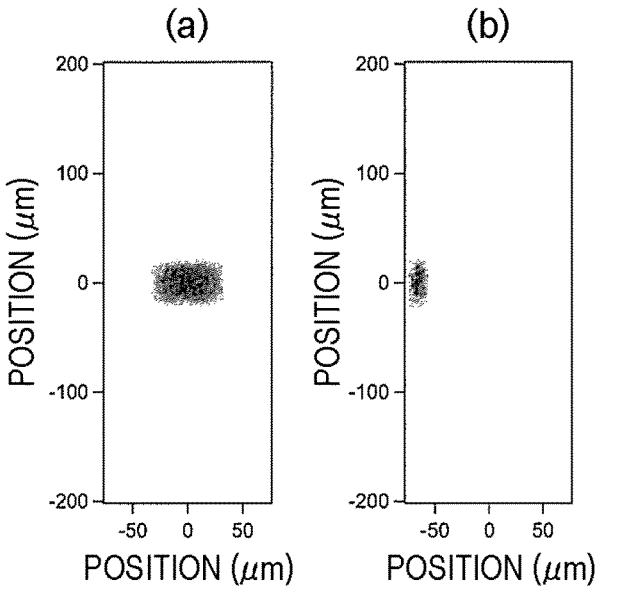
FIG. 12 illustrates a simulation result of the fluorescence reflection on the capillary surface.

This situation is illustrated by simulation in FIG. 12. In FIG. 12, the capillary array having a diameter of 150 μm, an inner diameter of 50 μm, and a pitch of 150 μm is set. The refractive index of a surrounding environment is set to 1. The refractive index of a capillary material is set to 1.46. The refractive index of the capillary lumen is set to 1.41. In the simulation, an imaging system of the NA0.36 and a detection camera are set on the front side of the drawing, and a fluorescent image of fluorescence generated in the capillary lumen is acquired.

In FIG. 12, a portion of an image corresponding to two adjacent capillaries on the camera is cut out and displayed. The positional relationship of the capillaries is similar to that in the schematic diagram of FIG. 11. FIG. 12(a) corresponds to the capillary 504a of FIG. 11. FIG. 12(b) corresponds to the capillary 504b of FIG. 11.

The left capillary 504a is emitting light. A black portion in the image of FIG. 12(a) is a light-emitting portion. The right capillary 504b is not emitting light. In the image of FIG. 12, the black color becomes darker as the fluorescence intensity is higher. The blackest portions in FIGS. 12(a) and 12(b) have the same density. This is because the color scale is set in each image. The fluorescence intensity of the image in FIG. 12(b) is actually lower than that in FIG. 12(a).

The capillary 504b corresponding to FIG. 12(b) does not emit light, but a black portion appears on the left side of the capillary. This portion corresponds to the region 504d in FIG. 11. In this way, the fluorescence reflected on the capillary surface enters the channel for detecting the adjacent capillary, and is observed as crosstalk.

Figure 13:
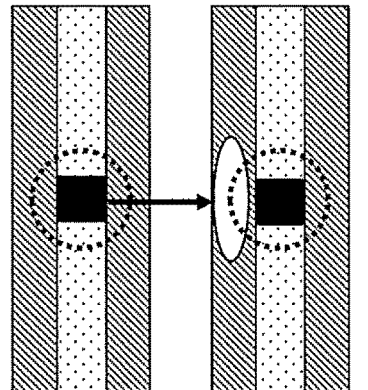
FIG. 13 is a schematic diagram illustrating a state in which crosstalk is reduced in the fluorescence detection device 1000 according to the second embodiment.
Figure 13:
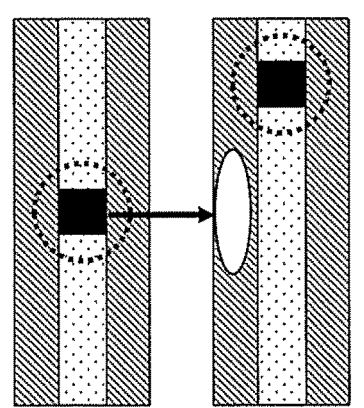

The reason why the crosstalk generated by the above causes is reduced by injection of excitation light at an angle will be described below. FIG. 13 is a diagram in which a portion detected by an optical fiber is added with a broken line on the schematic diagram of FIG. 11. In a case where irradiation is performed at the incident angle of 0° as illustrated in FIG. 13(a), the light emitting portions are arranged on respective capillaries at the angle of 0°, that is, horizontally. Thereafter, the light emitting portions of the adjacent capillaries are close to the portion where the crosstalk is generated by the above-described surface reflection. Therefore, the fluorescence reflected on the surface easily enters the optical fiber.

On the other hand, when the excitation light is emitted at an angle to the capillary array as illustrated in FIG. 13(b), the light emitting portions are also arranged at an angle on the respective capillaries, that is, spaced apart in the axial direction of the capillaries. On the other hand, since the portion where the crosstalk is generated by the surface reflection is at the same position as when the angle is 0° in FIG. 13(a), it is possible to separate the positions of the light emitting portion and the portion where the crosstalk is generated in the axial direction. As a result, the fluorescence reflected on the capillary surface hardly enters the fiber for measuring the adjacent capillary, and thus the crosstalk is reduced.

Figure 14:
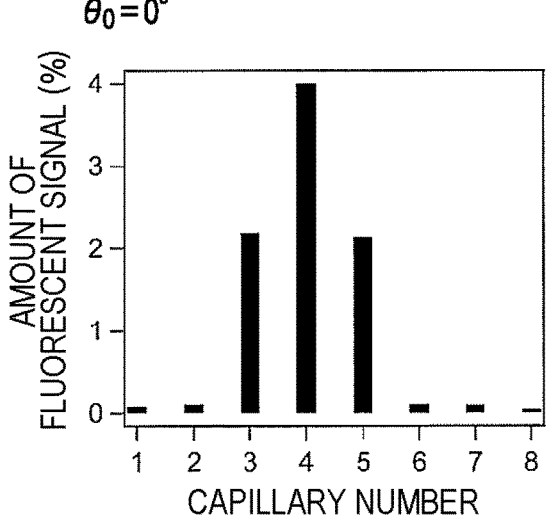
FIG. 14 is a diagram illustrating a crosstalk decreasing effect obtained by the fluorescence detection device 1000 according to the second embodiment.
Figure 14:
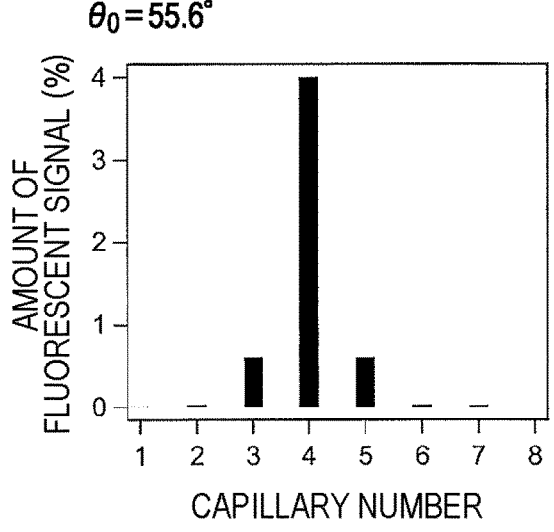

FIG. 14 quantitatively illustrates the above effect by ray-trace simulation. In this simulation, eight capillaries having a diameter of 150 μm are arranged at a pitch of 175 μm. A fiber having a core diameter of 100 μm and an NA of 0.4 is installed at a distance of 50 μm from the capillary for the light emitting portion of each capillary.

In FIG. 14, it is assumed that the fourth capillary is emitting light, and the power of the excitation light introduced into the optical fiber for detecting the fourth capillary is 100%. Fluorescence that is detected in capillaries other than the fourth capillary is crosstalk caused from the fourth capillary. When the excitation light is perpendicularly incident on the capillary array, the crosstalk generated in the capillaries adjacent to the capillary that is emitting light is about 2.2%. On the other hand, when the excitation light is emitted at an angle of 55.6°, the crosstalk generated in the adjacent capillaries is reduced to about 0.6%.

This crosstalk reduction effect is produced by separating a fluorescence emitting portion from a portion where crosstalk is caused by surface reflection in the axial direction and selectively detecting only fluorescence. Particularly in the present embodiment, in the fluorescence detection optical system 1001, the optical fiber guides only the light emitted from the portion where the light emission occurs in the capillary 504 to the detector. Thereby, it is possible to optically shield a portion (the portion where light emission does not occur) around the portion. This reduces the crosstalk.

Figure 15:
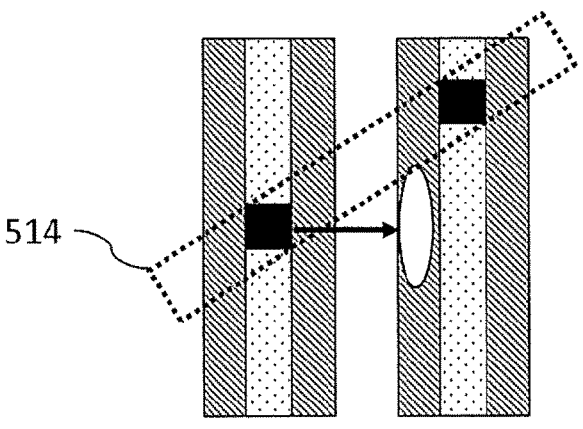
FIG. 15 is a configuration diagram in which optical slits are used in the fluorescence detection device 1000 according to the second embodiment.

As means for selectively extracting only fluorescence, an optical element other than the optical fiber may be used. As an example, as illustrated in FIG. 15, the fluorescence detection optical system 1001 may include an optical slit member 514 disposed in association with each capillary 504 (only the shape of the slit portion is indicated by a broken line in FIG. 15). The slit of the optical slit member 514 has such a size that only light from the fluorescence detection portion can pass therethrough.

In the fluorescence detection optical system 1001, the slit of the optical slit member 514 may be disposed in association with only the portion where light emission occurs in each capillary 504. In this way, the optical slit member 514 optically shields a portion (a portion where light emission does not occur) around the portion where light emission occurs in each capillary 504. Therefore, crosstalk can be reduced while fluorescence to be detected is efficiently transmitted.

Second Embodiment: Summary

When the laser beam 508 is incident on the side surface of the capillary array 501, the fluorescence detection device 1000 according to the second embodiment causes the laser beam 508 to have an angle with respect to a direction orthogonal to the axis of each capillary. The fluorescence generated in each capillary is guided to the fluorescence detection device 1003 by the optical fiber array 1002. The above configuration makes it possible to reduce crosstalk generated when fluorescence is reflected on the surface of the capillary and is incident on the optical fiber installed in the adjacent capillary.

Modifications

The present invention is not limited to the above-described embodiments, and includes various modifications. For example, the above-described embodiments have been described in detail for easy understanding of the present invention, and are not necessarily limited to those having all the described configurations. A part of the configuration of one embodiment can be replaced with the configuration of the other embodiments, and the configuration of the other embodiments can be added to the configuration of one embodiment. The other configurations can be added to, deleted from a part of the configuration in each embodiment, and a part of the configuration in each embodiment can be replaced with the other configurations.

REFERENCE SIGNS LIST

100 flow channel array
101 surrounding environment
102 flow channel
103 lumen
301 flow channel substrate

500 fluorescence detection device
501 capillary array
502 fluorescence excitation optical system
503 fluorescence detection optical system
504 (504*a*, 504*b*) capillary
505 laser light source
506 polarization control element
507 lens
508 laser beam
509 lens
510 lens
511 wavelength filter
512 grating
513 camera
514 optical slit member
1000 fluorescence detection device
1001 fluorescence detection optical system
1002 optical fiber array
1003 fluorescence detection device

The invention claimed is:

1. A light detection device comprising:

a flow channel array in which a plurality of tubes is arranged with axes of the plurality of tubes being parallel to each other, the flow channel array constituting a flow channel plane;

an irradiation optical system including a light source and configured to irradiate light emitted from the light source such that an oscillation direction of an electric field component of the light is parallel to the flow channel plane, an optical axis of the light is included in the flow channel plane, and the optical axis forms a predetermined angle $\theta_0$ with respect to a direction orthogonal to the axes of the plurality of tubes on the flow channel plane; and a light detection system configured to detect light emission from the plurality of tubes, wherein the predetermined angle $\theta_0$ satisfies following Formulas 1 and 2 in Mathematical formula 2 with respect to an angle $\theta_1$ of a light beam in a material of the plurality of tubes and an angle $\theta_2$ of a light beam inside the plurality of tubes determined as Mathematical formula 1 based on a refractive index $n_0$ of a surrounding environment, a refractive index $n_1$ of the material of the plurality of tubes, a refractive index $n_2$ of the material inside the plurality of tubes, and the predetermined angle,

[Mathematical formula 1]

$$n_0 \sin \theta_0 = n_1 \sin \theta_1 = n_2 \sin \theta_2$$

[Mathematical formula 2]

$$\theta_0 > 0.1 \frac{n_1 n_2}{\sqrt{n_2^2(n_1 - n_0)^2 + n_0^2(n_2 - n_1)^2}} \qquad \text{Formula 1}$$

$$\frac{(n_0 + n_1)^2(n_1 + n_2)^2 \cos\theta_0 \cos^2\theta_1 \cos\theta_2}{(n_0 \cos\theta_1 + n_1 \cos\theta_0)^2(n_2 \cos\theta_1 + n_1 \cos\theta_2)^2} > 1. \qquad \text{Formula 2}$$

23

2. The light detection device according to claim 1, wherein the predetermined angle $\theta_0$ further satisfies, when a number of the plurality of tubes is N, following Mathematical formula 3

[Mathematical formula 3]

$$\frac{\left(\frac{16n_0n_1^2n_2}{(n_1+n_0)^2(n_1+n_2)^2}\right)^{2\left(ceil\left(\frac{N}{2}\right)-1\right)}+\left(\frac{16n_0n_1^2n_2}{(n_1+n_0)^2(n_1+n_2)^2}\right)^{2\left(N-ceil\left(\frac{N}{2}\right)\right)}}{1+\left(\frac{16n_0n_1^2n_2}{(n_1+n_0)^2(n_1+n_2)^2}\right)^{2(N-1)}}<$$

$$\left[\frac{16n_0n_1^2n_2\cos\theta_0\cos^2\theta_1\cos\theta_2}{(n_0\cos\theta_1+n_1\cos\theta_0)^2(n_2\cos\theta_1+n_1\cos\theta_2)^2}\right].$$

3. The light detection device according to claim 1, wherein the light from the light source is incident on both sides of the flow channel array with the light facing each other.

4. The light detection device according to claim 1, wherein the plurality of tubes includes capillaries having an inner periphery and an outer periphery being circular in a cross section taken along a plane orthogonal to the axes of the plurality of tubes, and wherein, for an outer radius $R_{out}$ and an inner radius $R_{in}$ of the plurality of tubes, using a matrix expressed by

[Mathematical formula 4]

$$\hat{R}_{out}=\begin{pmatrix}1 & 0\\-\frac{n_2-n_0}{n_1}\frac{1}{\cos\theta_0 R_{out}} & \frac{n_0}{n_1}\end{pmatrix},\hat{R}'_{out}=\begin{pmatrix}1 & 0\\-\frac{n_0-n_1}{n_0}\frac{1}{\cos\theta_1 R_{out}} & \frac{n_1}{n_0}\end{pmatrix},$$

$$\hat{R}_{in}=\begin{pmatrix}1 & 0\\-\frac{n_2-n_1}{n_2}\frac{1}{\cos\theta_1 R_{in}} & \frac{n_1}{n_2}\end{pmatrix},\hat{R}'_{in}=\begin{pmatrix}1 & 0\\-\frac{n_1-n_2}{n_1}\frac{1}{\cos\theta_2 R_{in}} & \frac{n_2}{n_1}\end{pmatrix},$$

$$\hat{T}_1=\hat{T}'_1=\begin{pmatrix}1 & (R_{out}-R_{in})/\cos\theta_1\\0 & 1\end{pmatrix},\hat{T}_2=\begin{pmatrix}1 & 2R_{in}/\cos\theta_2\\0 & 1\end{pmatrix},$$

a matrix represented by

[Mathematical formula 5]

$$\hat{C}=\hat{R}'_{out}\hat{T}'_1\hat{R}'_{in}\hat{T}_2\hat{R}_{in}\hat{T}_1\hat{R}_{out}$$

is calculated, a focal length in the direction orthogonal to the axes of the plurality of tubes calculated by the 2 rows-by-1 column component of the matrix of [Mathematical formula 5] is represented by

[Mathematical formula 6]

$$f=-\frac{1}{(\hat{C})_{21}},$$

24 and the focal length satisfies

[Mathematical formula 7]

$$4f>\frac{d}{\cos\theta_0}$$

with respect to a pitch d of the plurality of tubes in the flow channel array.

5. The light detection device according to claim 4, further comprising:

a detection optical system that guides light emitted from the plurality of tubes to the light detection system, wherein in the detection optical system, a portion where light emission does not occur around a portion where light emission occurs in the plurality of tubes is optically shielded.

6. The light detection device according to claim 5, wherein the detection optical system includes an optical fiber, and wherein the optical fiber optically shields the portion where light emission does not occur by guiding only the light emitted from the portion where light emission occurs to a detector.

7. The light detection device according to claim 5, wherein the detection optical system includes an optical slit member disposed in association with the plurality of tubes, and wherein the optical slit member optically shields the portion where light emission does not occur.

8. A light detection device comprising:

a flow channel substrate including a plurality of flow channels arranged with axes being parallel to each other, the flow channel substrate constituting a flow channel plane;

an irradiation optical system including a light source and configured to irradiate light emitted from the light source such that an oscillation direction of an electric field component of the light is parallel to the flow channel plane, an optical axis of the light is included in the flow channel plane, and the optical axis forms a predetermined angle $\theta_0$ with respect to a direction orthogonal to the axes of the plurality of flow channels on the flow channel plane; and a light detection system configured to detect light emission from the plurality of flow channels, wherein the predetermined angle $\theta_0$ satisfies

[Mathematical formula 8]

$$0.1\frac{n_1}{|n_1-n_0|}<\theta_0<\arcsin\left(\sqrt{\frac{n_1^2(n_0^2+n_1^2)}{n_0^4+n_0^2n_1^2+n_1^4}}\right)$$

where a refractive index of a material of the flow channel substrate is presented by $n_0$, and a refractive index of a material inside the plurality of flow channels is represented by $n_1$.

* * * * *